United States Patent [19]
Bushick

[11] 3,715,406
[45] Feb. 6, 1973

[54] PROCESS FOR PRODUCING SYM-OCTAHYDROANTHRACENE FROM SYM-OCTAHYDROPHENANTHREN

[75] Inventor: Ronald D. Bushick, Markus Hook, Pa.

[73] Assignee: Sun Oil Company, Philadelphia, Pa.

[22] Filed: Aug. 2, 1968

[21] Appl. No.: 750,432

Related U.S. Application Data

[63] Continuation of Ser. No. 590,225, Oct. 28, 1966, Pat. No. 3,396,203.

[52] U.S. Cl. .................................................. 260/668 F
[51] Int. Cl. .................................................. C07c 15/28
[58] Field of Search .................................... 260/668 F

[56] References Cited

UNITED STATES PATENTS 3,389,188   6/1968   Michalowicz .................... 260/668 F

*Primary Examiner*—Curtis R. Davis
*Attorney*—George L. Church, Donald R. Johnson, Wilmer E. McCorquodale, Jr. and Barry A. Bisson

[57] ABSTRACT

Sym-octahydroanthracene (s-OHA) is produced from sym-octahydrophenanthrene (s-OHP) by a process comprising contacting s-OHP with a solid phase silica-alumina catalyst for a period of time sufficient to isomerize the s-OHP to s-OHA. The s-OHA can be recovered from the reaction mixture and then be converted to anthracene by catalytic dehydrogenation.

1 Claim, No Drawings

PROCESS FOR PRODUCING SYM-OCTAHYDROANTHRACENE FROM SYM-OCTAHYDROPHENANTHREN

CROSS REFERENCES TO RELATED APPLICATIONS

The present application is a continuing application, in accordance with 35 U.S.C. 120, of my copending patent application Ser. No. 590,225, filed Oct. 28, 1966, now U.S. Pat. No. 3,396,203 entitled "Alumino-Silicate Catalyzed Reactions of Polycyclic Aromatic Hydrocarbons," Since said Ser. No. 590,225 was copending with my patent application Ser. No. 534,428 filed Mar. 15, 1966 (which issued Aug. 15, 1967 as U. S. Pat. No. 3,336,407) entitled "Catalytic Conversion of 1,2,3,4,-tetrahydronaphthalene, Indan, and Other Materials," this present application is also entitled to the benefit accorded by 35 U.S.C. 120 as to said application Ser. No. 534,428 and to my two abandoned applications referred to therein; namely, Ser. No. 388,693 filed Aug. 10, 1964 and Ser. No. 347,685, filed Feb. 27, 1964. The disclosure of all of the above-cited applications (all of which are assigned to the Sun Oil Company) is hereby incorporated in the present application.

This invention relates to a method of converting symmetrical octahydrophenanthrene, also called octanthrene (hereinafter s-OHP), to its isomer, symmetrical octahydroanthracene, also called octhracine (hereinafter s-OHA), or s-OHA, to its isomer, s-OHP. This method comprises contacting a feed rich is one of the said isomers with an acidic alumino-silicate catalyst at a temperature above 40°C. (e.g., 190°–350°C.) but below cracking temperature, whereby isomerization of the contacted isomer to the other isomer occurs. The invention in another aspect relates to continuing said contacting until there has been produced at least one product selected from the group consisting of 1-cyclohexyl-2-phenylethane (hereinafter, sometimes, CHPE), asymmetrical octahydroanthranthracene (hereinafter a-OHA), asymmetrical octahydrophenanthrene (hereinafter a-OHP), 1,2,3,4-tetrahydroanthracene (hereinafter THA), 1,2,3,4,-tetrahydrophenanthrene (hereinafter THP), anthracene, and phenanthrene.

The s-OHP/s-OHA isomerization is depicted as

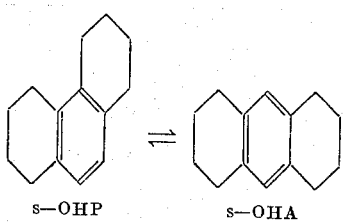

s—OHP  s—OHA

The structural formulas of the other above-mentioned products are as follows:

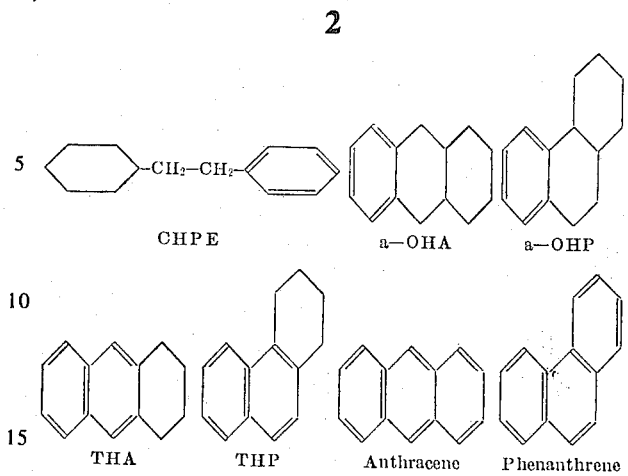

CHPE  a—OHA  a—OHP

THA  THP  Anthracene  Phenanthrene

The various products which can be made by the invention have a variety of uses. They can be oxidized to polycarboxylic acids and acid anhydrides which can be condensed with glycols to make resinous polyesters. For example, as in Belgian Pat. No. 635,872 of Dec. 2, 1963, s-OHA and s-OHP can be converted to pyromellitic acid and mellophanic acid, respectively, by nitric acid oxidation. s-OHA, s-OHP, a-OHA, a-OHP, THA and THP can be converted to acid anhydrides by vapor phase oxidation with oxygen and a catalyst such as $V_2O_5$, as in French Pat. No. 1,426,897.

THA and THP can be reduced to anthracene and phenanthrene, respectively, as by passing over warm copper or over Pt on charcoal at about 300°C.

s-OHA, s-OHP, a-OHA, a-OHP, THA THP, anthracene and phenanthrene and mixtures thereof can be also be converted to foaming agents and detergents, as by the processes in *Reinchsamt Wirtschaftsausbau Chem. Ber. Pruef-Nr.* 015(PB52017), 859–78 (1942) (see *Chem. Abstracts* 41: 6553g). They can also be transformed into synthetic beater sizes by condensation with polybasic acids or acid anhydrides, as in the processes *Das Papier* 6, 10–18 (1952), see *Chem. Abstracts* 46: 4793g.

THP, s-OHP, a-OHP, phenanthrene and mixtures thereof are useful as plasticizers, as for polystrene (see U.S. Pat. No. 2,454,851 and U.S. Pat. No. 2,289,743). Such plasticizers need not be free of the corresponding anthracene isomers and the catalyst-free mixtures of isomers produced by the present invention can often be utilized directly as plasticizers without further processing.

The feed s-OHA or s-OHP or non-equilibrium mixtures thereof can be obtained by means disclosed in my copending application Ser. No. 534,428, filed Mar. 15, 1966. For example, it is disclosed therein that tetralin can be converted in the presence of $HF-BF_3$ or $HF-BCl_3$ to s-OHA and s-OHP. Also, in my aforementioned U.S. patent application the isomerization of s-OHP to s-OHA and the isomerization of s-OHA to s-OHP, in the presence of $HF-BF_3$ or $HF-BCl_3$, is disclosed.

In the present invention, a feed comprising s-OHP or s-OHA or comprising a mixture of s-OHA and s-OHP is contacted with an acidic alumino-silicate catalyst at a temperature above 80°C. but below cracking temperature. The acidic alumino-silicate catalyst should contain, initially, less than about 12 percent by weight of water. As is shown hereinafter the nature of the products of my process can be altered by the presence of moisture in the catalyst. In some cases it is desirable that the catalyst contain less than 1 percent of water. One indication of the water content of the catalyst is the percent weight loss on ignition at 1,050°F. for 4 hours, hereinafter sometimes referred to as percent LOI. For purposes of the present invention this ignition loss is assumed to represent water in the zeolite; however, a small proportion of this loss may be adsorbed molecules other than water, such as carbon dioxide or ammonia (in the case of a protonated catalyst prepared by ammonium-ion exchange).

The acidic alumino-silicate catalyst will have a pH less than 7 in 10 percent aqueous suspension at 20°C. and, preferably, will contain less than 3 percent of monovalent alkali metal cations, such as $Na^+$.

The catalyst can be primarily crystalline or primarily amorphous or a combination thereof. For example, the catalyst can be a primarily amorphous acidic alumino-silicate such as the zeolites of U.S. Pat. Nos. 2,253,285, 2,302,277, 2,617,712, 2,763,622 and 2,767,148. The catalyst can also be primarily crystalline alumino-silicate such as the protonated zeolites prepared by exchange of hydrogen ion for the sodium ion in heulandite, analcite, chabazite, and such synthetic zeolites as the Type X zeolite of U.S. Pat. No. 2,822,244 and the zeolites of U.S. Pat. No. 3,200,083 which are denoted as Types Y and L. Other useful catalysts are those zeolite minerals, such as levynite, brewsterite, edingtonite, staurolite, and zoisite, which contain less than 2 percent of alkali metal cations.

Also useful as catalysts are crystalline alumino-silicate zeolites with amorphous binders wherein the monovalent alkali metal ions in the binder and in the crystalline zeolite are exchanged with $H^+$ or polyvalent metal cations, such as the clay-bound zeolites of U.S. Pat. No. 3,158,579. Other useful catalysts are partially protonated, rare earth-exchanged crystalline zeolites in an amorphous silica-alumina matrix such as those of U.S. Pat. No. 3,140,251, 3,194,754, and 3,210,267.

Where the catalyst is to be regenerated by high temperature calcination, especially preferred catalysts are those crystalline alumino-silicate zeolites having an Al/Si atomic ratio from 0.65 to 0.2 and containing at least one trivalent or divalent metal, metal oxide, or metal hydroxide cation for every 12 atoms of aluminum in said alumino-silicate and wherein there is no more than one monovalent metal cation for every 12 atoms of aluminum in said alumino-silicate. Such catalysts are usually prepared by ion-exchange of solvated protons and/or polyvalent metal cations for alkali metal and/or other metal cations of such zeolites as analcite, chabazite, phillipsite, heulandite, Type Y of U.S. Pat. No. 3,013,984 and Type L of U.S. Pat. No. 3,013,984.

For example, suitable polyvalent metal cations are $Al^{+3}$, $Ni^{+3}$, $Ti^{+3}$, $V^{+3}$, $Mn^{+3}$, $Mo^{+3}$, $Ru^{+3}$, $Rh^{+3}$, $Sb^{+3}$, $La^{+3}$, $W^{+3}$, $OS^{+3}$, $Ir^{+3}$, $Bi^{+3}$, $Ce^{+3}$, $Pr^{+3}$, $SM^{+3}$, $Gd^{+3}$, $Tb^{+3}$, $Dy^{+3}$, $U^{+3}$, $Mg^{+2}$, $Ca^{-2}$, $Ba^{+2}$, $Sr^{+2}$, $V^{+2}$, $Cr^{+2}$, $Mn^{+2}$, $Fe^{+2}$, $Co^{+2}$, $Ni^{+2}$, $Mo^{+2}$, $Ru^{+2}$, $Rh^{+2}$, $Pd^{+2}$, $Sn^{+2}$, $W^{+2}$, $Re^{+2}$, $Os^{+2}$, $Ir^{+2}$, $Pt^{+2}$, $Pb^{+2}$, $Sm^{+2}$, $Eu^{+2}$, $Gd^{+2}$, $Dy^{+2}$, $Yb^{+2}$, and the stable trivalent and divalent oxides and hydroxides of these metals, such as (for manganese), $Mn(OH)_4^{+3}$, $MnO(OH)_2^{+3}$, $MnO_2^{+3}$, $Mn(OH)_3^{+3c}$, $MnOOH^{+3}$, $MnOH^{+3}$, $Mn(OH)_5^{+2}$, $MnO_2(OH)^+$, $MnO(OH)_3^{+2}$, $Mn(OH)_4^{+2}$, $MnO(OH)_2^{+2}$, $MnO_2^{+2}$, $MnO^{+2}$, or (for molybdenum) $Mo(OH)_3^{+3}$, $MoO(OH)^{+3}$, $Mo(OH)_2^{+3}$, $MoO^{+3}$, $MoOH^{+3}$, $Mo(OH)_4^{+2c}$, $MoO(OH)_2^{+2}$, $MoO_2^{+2}$, $Mo(OH)_3^{+2}$, $MoO(OH)^{+2}$, $Mo(OH)_2^{+2}$, $MoO^{+2}$, $MoOH^{+2}$, or (for cerium) $CeOH^{+3}$, $CeOH^{+2}$, $Ce(OH)_2^{+2}$, $CeO^{+2}$.

For a given cation, the pH (or pK) of the exchange solution (and wash solutions) determines whether the exchanged species is the "bare cation" or a hydroxide. For activated zeolites the moisture content (as indicated by loss on ignition) determines whether exchanged hydroxide is present or was converted, by dehydration, to the oxide.

Where the final products desired are the result of hydrogen dismutation and/or hydrogen transfer, it is preferred that the acidic alumino-silicate catalyst contain from 0.05 to 5 percent of hydrogenation catalyst such as platinum, palladium, nickel, nickel oxide, nickel sulfide, molybdenum oxide, molybdenum sulfide, cobalt oxide, palladium oxide, and the like.

The hydrogenation catalyst, in finely-divided form, can be physically admixed with the acidic alumino-silicate, such as the catalysts of U.S. Pat. No. 3,173,853. The hydrogenation catalyst can also be incorporated into the alumino-silicate by salt impregnation, such as the catalysts of U.S. Pat. Nos. 2,507,864, 3,137,656, 3,186,935, and 3,236,762. Where the acidic alumino-silicate catalyst is crystalline it is preferred that the hydrogenation catalyst be introduced by ion exchange and/or be finely dispersed within the pores of the zeolite as in U.S. Pat. Nos. 2,971,904, 3,013,982, and 3,200,082. Where the hydrogenation catalyst is a free metal which is incorporated in a crystalline alumino-silicate it is preferred that the catalyst be pre-reduced, such as in U. S. Pat. No. 3,201,356. Hydrogenation catalysts comprising nickel, molybdenum, and oxides thereof can be sulfided as by $H_2S$ or hydrogen with $H_2S$ or $CS_2$ (see U.S. Pat. Nos. 3,173,854 and 3,166,491).

For optimum s-OHP/s-OHA isomerization the zeolite catalyst should be heated, preferably in a stream of flowing air, to reduce water and other volatile polar materials to less than 2 percent (as determined by percent LOI). Water may also be removed from the catalyst in situ, that is, by contacting the catalyst with liquid OHP and/or OHA at a temperature above the boiling point of water under conditions such that the water is removed from the reactor.

The catalyst can contain as much as 12 percent water when it is desired to further convert s-OHP and/or s-OHA to other products, such as a-OHA and a-OHP. Before initiating the reaction the water content of the catalyst can be increased by exposure to an atmosphere of controlled humidity. Water can also be added to the reactor in the course of the reaction, as by steam injections.

The reaction can be converted out in any convenient manner using equipment of conventional type. For example, an s-OHA and/or s-OHP starting material is charged to a closed reaction vessel equipped with heating and agitation means, as a slurry reactor. The desired amount of the alumino-silicate catalyst and hydrocarbon feed are added and the vessel is then preferably shaken or the contents thereof otherwise agitated in order to insure efficient contact of the catalyst with the hydrocarbon. The reaction mass is heated to the reaction temperature and then maintained at the reaction temperature for sufficient time to allow conversion to occur. The pressure in the reactor is usually around atmospheric; however, the pressure.

can be below atmospheric (as about 3 mm. Hg) as where it is desired that the reaction be run at reflux below the atmospheric boiling temperature. The reaction can also be run at superatmospheric pressure, such as autogenous pressure below the cracking temperature.

At the end of the reaction period the reaction vessel contains catalyst, s-OHA, and s-OHP and side products, the nature and amount of said side products being controlled by the type of catalyst, reaction temperature and contact time (as is shown hereinafter).

The alumino-silicate catalyst is separated from the hydrocarbons in the reaction product, as by filtration. When present in the reaction product, anthracene (which melts at 214°C.) can be separated therefrom by crystallization. The s-OHA and s-OHP can be separated from the other organic materials by means described in my aforementioned application Ser. No. 534,428. For example, s-OHA and s-OHP can be distilled off, such as, at about 167°C. at 12 mm. Hg or at about 80°-85°C. and 0.1 mm. Hg. The distillate can also contain THP, a-OHA and a-OHP if these are present in appreciable amount in the reaction mixture.

The hot distillate is cooled to below about 74°C. to recover relatively pure crystalline s-OHA which is separated, for example, by filtration. The separated s-OHA, which is relatively pure s-OHA because its purity is substantially higher than the s-OHA content of the reaction mixture, can be further purified by recrystallization from an alcohol such as methanol at room temperature.

If the reaction product did not contain appreciable amounts of a-OHA and a-OHP, the filtrate is a liquid mixture of S-OHP and a relatively small amount of s-OHA which mixture can either be recycled, if further conversion to OHA is desired, or be further purified by crystallization. When a-OHA is present it can be recovered from the filtrate by crystallization below about 64°C. When THP is present in the filtrate it can be recovered by distillation as at about 300°-310°C. and 735 mm. Hg.

When present in the reaction product, THA can be recovered from the reaction product or from the distillation bottoms by crystallization at below 88°C. and THP can be recovered from the bottoms by distillation, as at about 300°-310°C. and 735 mm. Hg.

Phenanthrene, s-OHP, a-OHP, and THP can be separated from anthracene, s-OHA, a-OHA, and THA by selective adsorption using molecular sieves, such as by the process of U. S. Pat. No. 2,967,896.

Anthracene can also be recovered by the use of maleic anhydride as in U. S. Pat. No. 2,440,688 or by use of selective solvents as in U. S. Pat. Nos. 2,828,346 and 2,783,287.

The reaction can also be run in liquid, vapor or trickle phase utilizing a fixed bed of granular catalyst. For example, a suitable catalyst for such a bed comprises CeHY zeolite containing at least 7 percent (preferably 12 percent) Ce and less than 1 percent Na, prepared by calcination (for 4 hours at about 400°C. in flowing air) of extruded 1/16 inches diameter ×1/16 inches long cylinders of CeNH$_4$ Y zeolite in about 25 percent of an acidic amorphous alumino-silicate binder. The CeNH$_4$ Y zeolite is prepared by aqueous exchange exchange with 1.5 percent Ce (NO$_3$)$_3$. 6H$_2$O of an NH$_4$ Y zeolite containing less than 1.2% Na, prepared by ammonium-ion exchange of a sodium Y zeolite.

The following examples illustrate the conversion of s-OHP to s-OHA by means of an acidic alumini-silicate catalyst,

ILLUSTRATIVE EXAMPLES

In the following examples, all percentages are on a weight basis.

The reaction vessel comprises a 50 milliliter round bottom flask, connected by means of a ground glass joint to a vertical glass column containing a hollow side arm, the top of the vertical column being connected by a ground glass joint to a condensor, the condensor being connected to a vacuum pump by a zone which is cooled with liquid nitrogen and wherein any vapor which passes through the condensor can be trapped. The 50 milliliter flask rests in a Wood's metal bath which rests on an electric hot plate. In the vertical glass column, between the top and bottom orifices of the side arm, is contained a bed of catalyst which is maintained in the column by a stainless steel wire screen.

To effect the isomerization reaction, 25 cc of s-OHP are placed in the 50 milliliter flask and 10 cc of the catalyst are placed in the vertical column and supported therein by the wire screen. The system is then evacuated to the desired pressure (in the present case 50 millimeters of mercury) and heat is applied to the flask until the reflux temperature is reached. The temperature is then maintained by controlling the heat of the hot plate and 0.2 milliliter samples of the catalyst-free reaction product are removed each hour and analyzed by vapor phase chromatography.

EXAMPLE I 25 cc of s-OHP, obtained by catalytic hydrogenation of phenanthrene, was brought to reflux at 200°C. and 50 mm. Hg. abs. and caused to contact with 10 cc of a heat-activated commercially available acidic alumino-silicate catalyst comprising about 1 part by weight of a substantially anhydrous protonated rare earth-containing zeolite and 9 parts by weight of substantially sodium free, acid-exchanged kaolin binder. After 15 minutes of catalyst/feed contact at reflux, the liquid in the 50 milliliter flask was a light green color, indicating that the isomerization reaction was occurring. After 30 minutes of contact, the catalyst had turned black in color, indicating that appreciable reaction with the hydrocarbon had occurred.

After one hour of catalyst/feed contact at reflux, 4.5 percent of the catalyst-free reaction mixture was s-OHA, 93.7 percent was s-OHP and the remainder was other hydrocarbons. After two hours of catalyst/feed contact at reflux, 6.6 percent of the reaction mixture was s-OHA, 89.0 percent was s-OHP and the remainder was other hydrocarbons.

EXAMPLE II

Example I is repeated except that the catalyst is 10 cc of a heat-activated Type M cracking catalyst, sold by the Houdry Process Company. Houdry Type M catalyst is described by G. A. Mills, in AGING OF CRACKING CATALYSTS, I. & E. CHEM., Vol, 42 No. 1, pp. 182-187 (1950). The catalyst is a calcined, acidic amorphous alumino-silicate and contains 89 percent SiO$_2$, 11 percent Al$_2$O$_3$ and less than 0.5 percent sodium. The catalyst turned black at the first sign of contact with the refluxing hydrocarbon, indicating that the catalyst had considerable isomerization activity. After one hour of contacting at reflux, the catalyst-free reaction mixture analyzed 14.0 percent s-OHA and 85.0 percent s-OHP. A sample taken after two hours of reflux analyzed 23.0 percent s-OHA and 76.0 percent s-OHP. A sample taken after three hours of contact at reflux analyzed 33.0 percent s-OHA and 65.0 percent s-OHP.

EXAMPLE III

Example I is repeated except that the catalyst was 10 cc of an activated silica-alumina catalyst sold commercially under the trade designation S–90. After 1 hour of reflux (at 200°C. and 50 mm. Hg. abs.), the catalyst-free reaction mixture contained 6.8 percent OHA and 92.0 percent OHP. After 2 hours of contact at reflux, the catalyst-free reaction mixture contained 18.0 percent OHA and 80.1 percent OHP. after three hours of contact at reflux, the catalyst-free reaction mixture contained 19.9 percent s-OHA and 78.7 percent s-OHP.

The s-OHA can be recovered from the reaction mixtures of the above examples by means described in my aforementioned co-pending patent application, Ser. No. 534,428 filed Mar. 15, 1966, now U. S. Pat No. 3,336,407. Also disclosed in U. S. Pat. No. 3,336,407 are the dehydrogenation of s-OHA to produce anthracene by passage of s-OHA over a selenium catalyst at about 325°C. and the further isomerization to s-OHA of the s-OHP remaining after the s-OHA separation.

British Pat. No. 694,961 (7/1953) can be referred to for further teachings relating to the conversion of phenanthrene to anthracene by a process comprising
 a. hydrogenating phenanthrene to sym-octahydrophenanthrene,
 b. contacting said sym-octahydrophenanthrene with a catalyst at a conversion temperature for a period of time sufficient to isomerize said sym-octahydrophenanthrene to sym-octahydroanthracene to give a mixture of sym-octahydrophenanthrene and sym-octahydroanthracene,
 c. separating said sym-octahydroanthracene from said mixture (as by cooling to precipitate sym-octahydroanthracene), and
 d. dehydrogenating said sym-octahydroanthracene.

In the present invention, such a process involves, in step (b) contacting said sym-octahydrophenanthrene with a solid phase silica-alumina catalyst at a temperature above 40°C. (e.g., 190°–350°C. or 200°–250°C.) but below cracking temperature, for a period of time sufficient to isomerize said sym-octahydrophenanthrene to sym-octahydroanthracene.

At the lower temperatures (e.g., 80°–120°C.), the preferred catalyst is the crystalline acidic Gd alumino-silicate catalyst (e.g., GdHY zeolite) described, for example, in my copending patent application Ser. No. 718,980 filed Mar. 26, 1968, now U.S. Pat. No. 3,534,114. IG is sometimes advantageous in the isomerization of polycyclic aromatic hydrocarbons with acidic alumino-silicate catalysts to conduct the catalyst/feed contact at from 100°–800°F. in the presence of from 5–2,000 psi of hydrogen. A particularly useful process is the isomerization of s-OHP to s-OHA in the presence of 15–250 psi of hydrogen and a crystalline acidic alumino-silicate catalyst containing less than one alkali metal cation and at least one divalent, trivalent or tetravalent metal, metal oxide or metal hydroxide for every 12 atoms of aluminum in the alumino-silicate zeolite framework.

I claim:
1. A method of producing sym-octahydroanthracene comprising contacting sym-octahydrophenanthrene with a solid phase silica-alumina catalyst for a period of time sufficient to isomerize said sym-octahydrophenanthrene to sym-octahydroanthracene.

* * * * *